Figure 4:
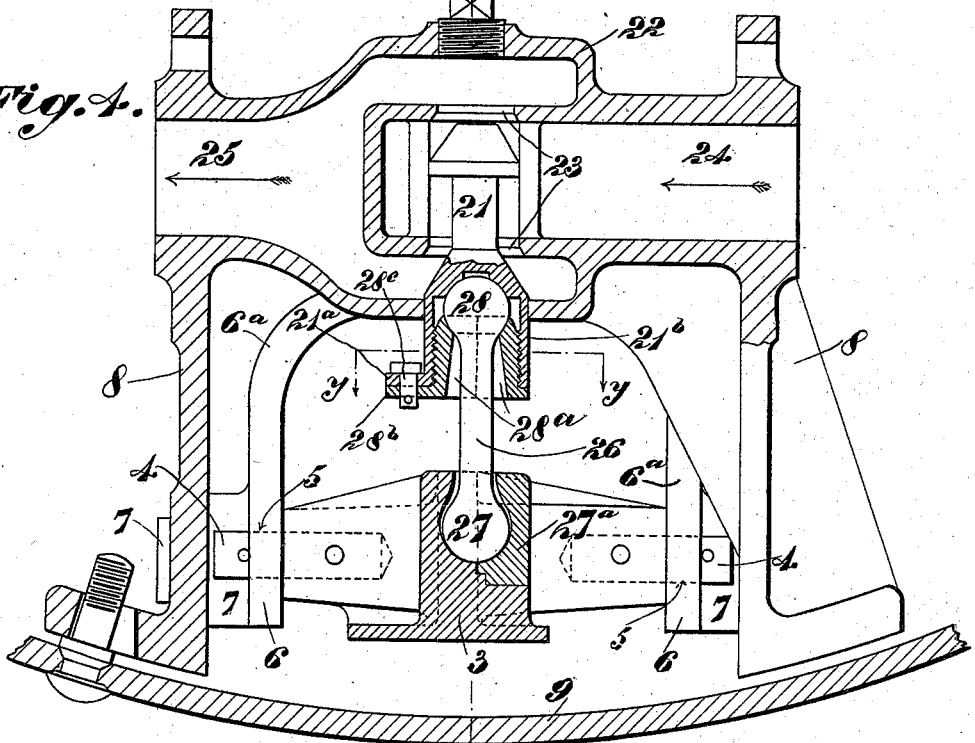

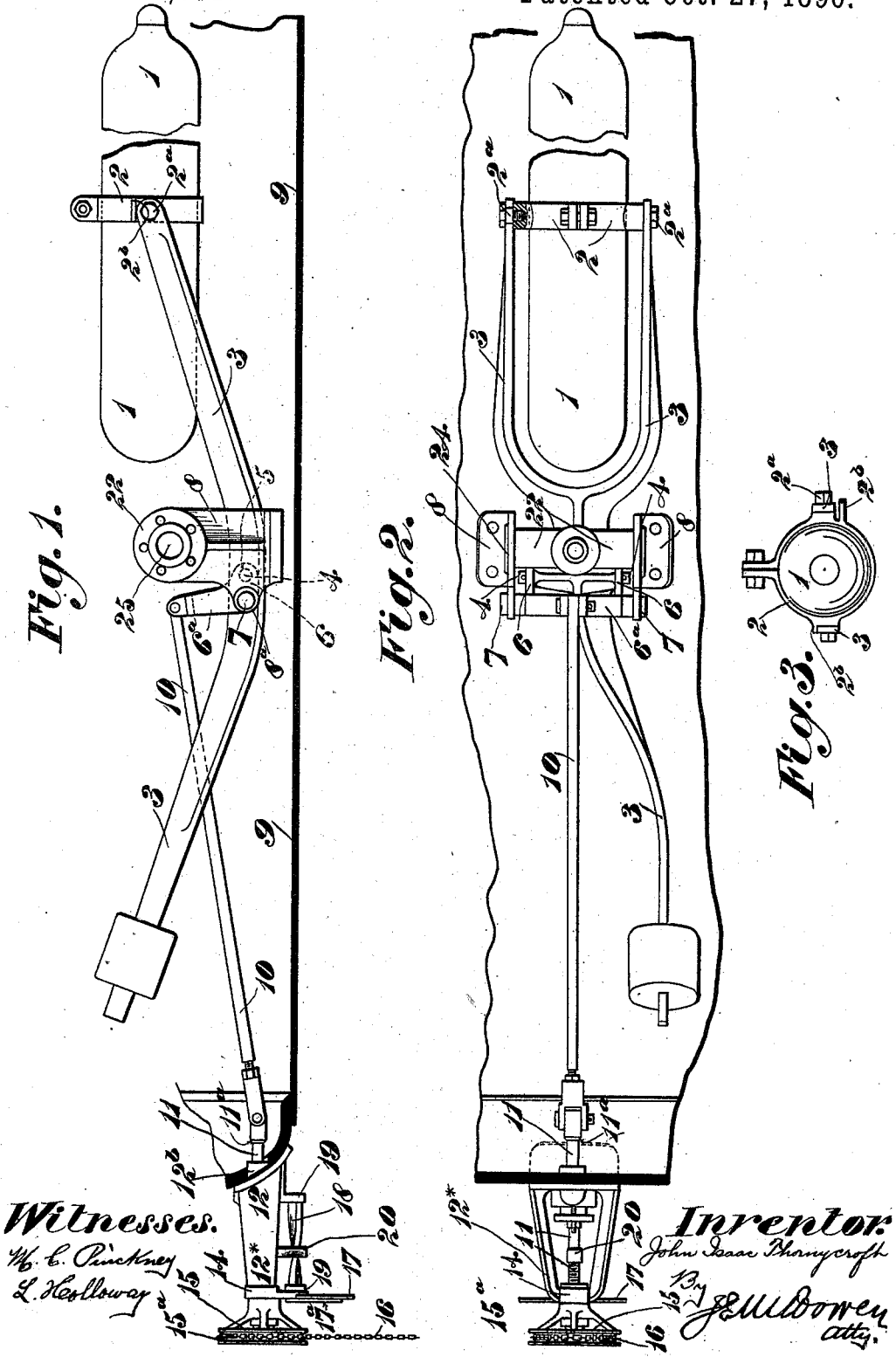

(No Model.) 6 Sheets—Sheet 2.

J. I. THORNYCROFT.
AUTOMATIC FEED WATER REGULATOR.

No. 570,351. Patented Oct. 27, 1896.

Witnesses.
W. C. Pinckney
L. Holloway.

Inventor:
John Isaac Thornycroft
By J&M Bower
Atty.

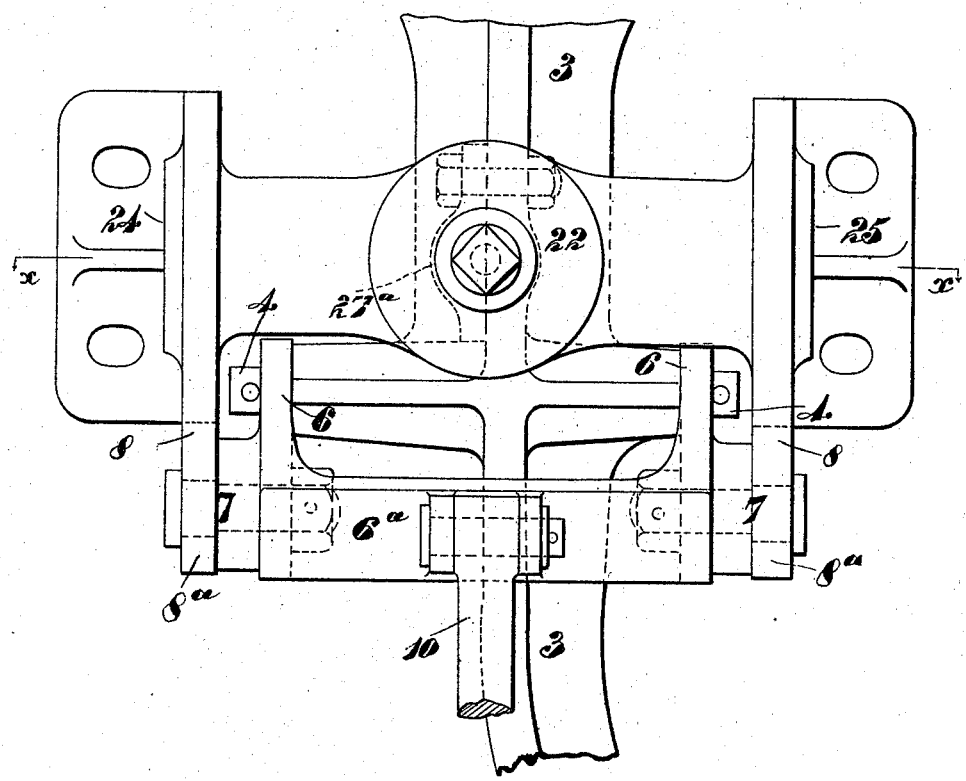

(No Model.)
J. I. THORNYCROFT.
AUTOMATIC FEED WATER REGULATOR.
No. 570,351.
Patented Oct. 27, 1896.
6 Sheets—Sheet 4.
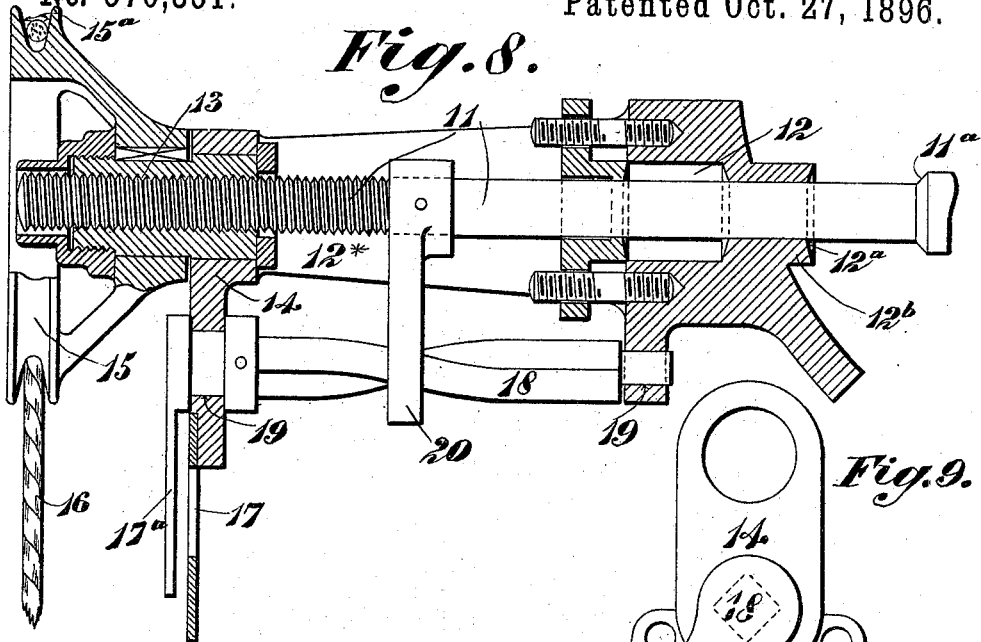
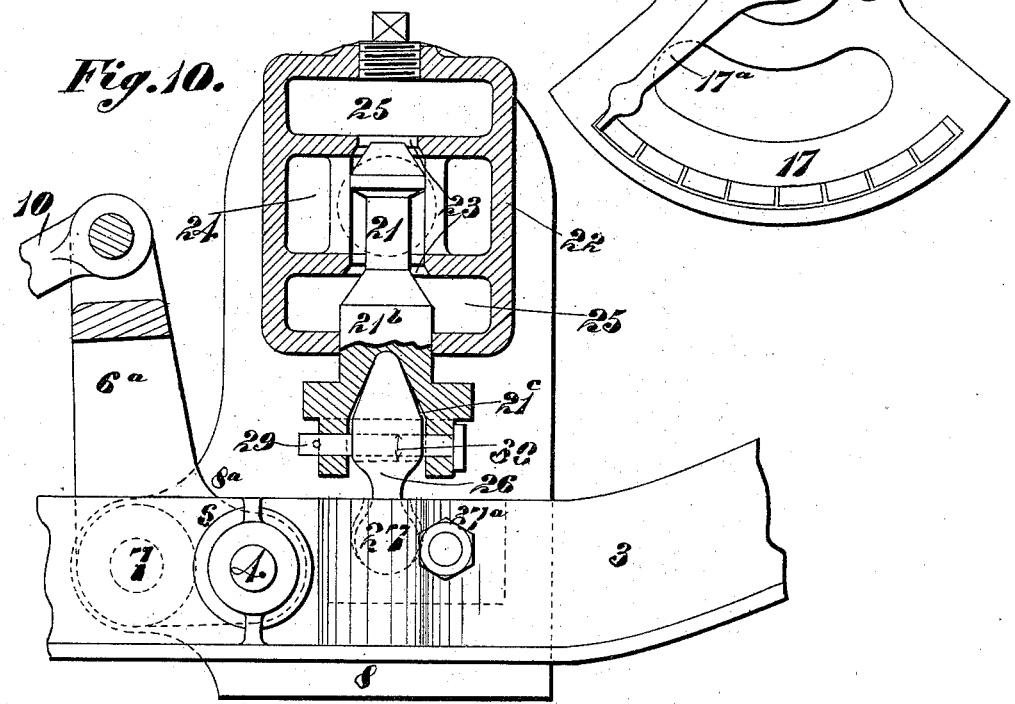
Witnesses.
W. C. Pinckney
L. Holloway
Inventor:
John Isaac Thornycroft,
By J. E. M. Dowell
atty.

(No Model.) 6 Sheets—Sheet 5.
J. I. THORNYCROFT.
AUTOMATIC FEED WATER REGULATOR.
No. 570,351. Patented Oct. 27, 1896.
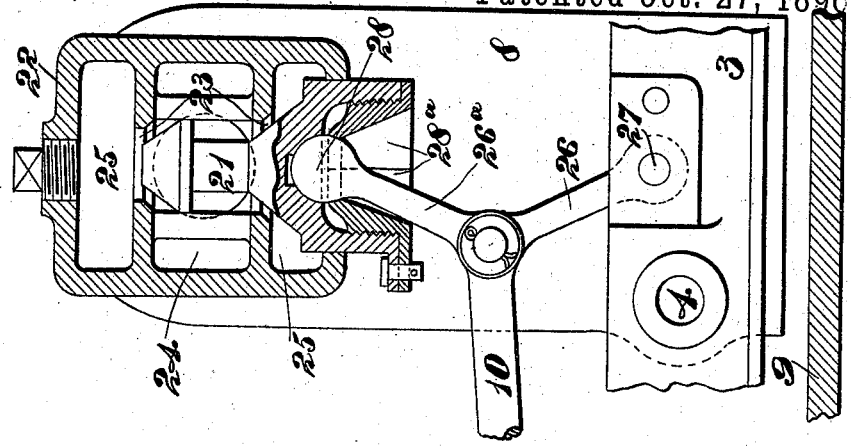
Fig. 12.
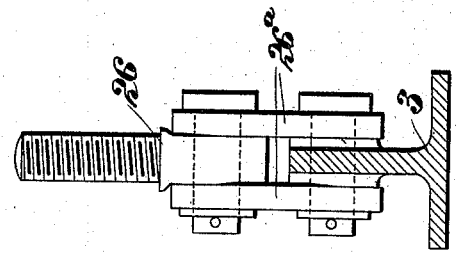
Fig. 11ª.
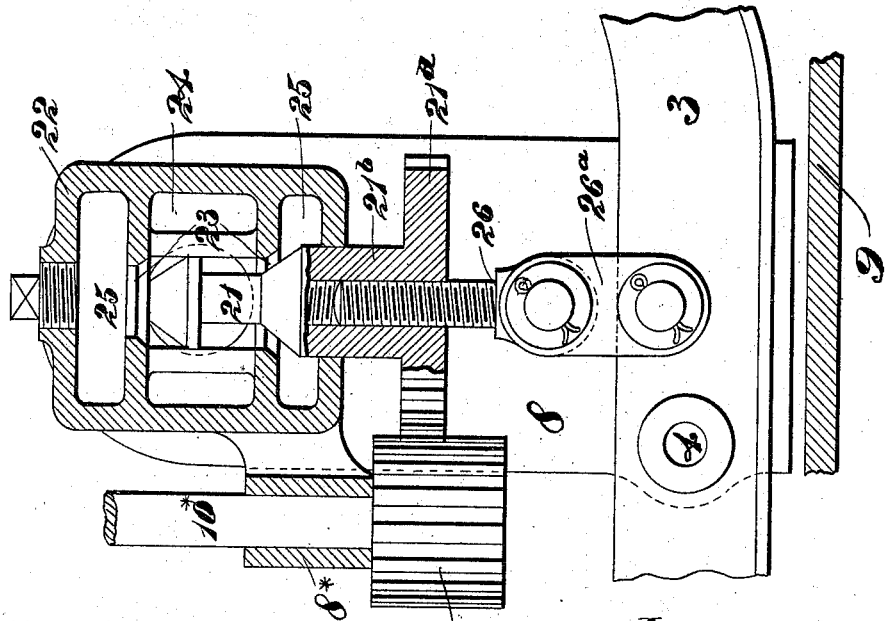
Fig. 11.
Witnesses.
W. C. Pinckney
L. Holloway.
Inventor:
John Isaac Thornycroft,
By J. E. M. Bowen
Atty.

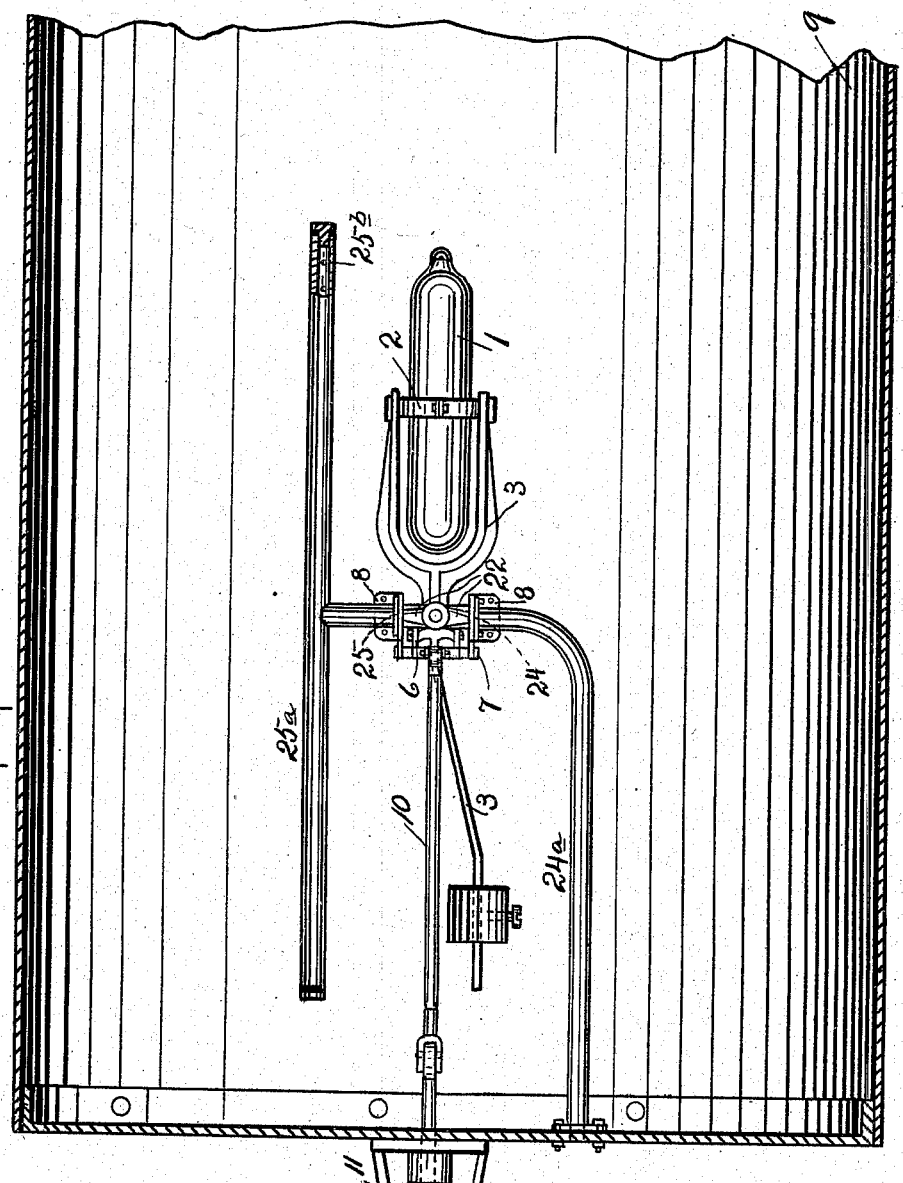

UNITED STATES PATENT OFFICE.

JOHN ISAAC THORNYCROFT, OF LONDON, ENGLAND.

AUTOMATIC FEED-WATER REGULATOR.

SPECIFICATION forming part of Letters Patent No. 570,351, dated October 27, 1896.

Application filed November 22, 1894. Serial No. 529,678. (No model.)

*To all whom it may concern:*

Be it known that I, JOHN ISAAC THORNYCROFT, a subject of the Queen of Great Britain and Ireland, residing at Chiswick, London, in the county of Middlesex, England, have invented Improvements in Automatic Feed-Water Regulators, of which the following is a specification.

This invention has reference to apparatus for automatically regulating the supply of feed-water to water-tube and other boilers in which the supply of feed-water is governed by the action of the varying water-level upon a float or floats arranged within the boiler and controlling a feed-water valve also located within the boiler; and it has for its objects to enable the apparatus to be readily adjusted from time to time from the exterior of the boiler, so that a practically constant water-level can be maintained in the boiler with varying rates of steaming; to afford a ready indication of the height of the water-level for which the apparatus is for the time being set, and to construct and arrange the feed-valve and its controlling mechanism in such a way as to avoid as far as possible all friction between the two, and so that in the event of failure of any part of the valve-controlling mechanism the valve will automatically move into the open or safety position.

According to my invention the feed-water valve is controlled by a lever provided with a float or floats, and the position of the fulcrum of which, or of the length of the connection between the lever and valve, can be adjusted through suitable mechanism from the exterior of the boiler, so that the positions in which the lever will be caused to close the feed-valve through the action of the float or floats, and consequently the height of the water-level in the boiler, can be varied from time to time to suit requirement. As will be obvious, apparatus suitable for thus adjusting the fulcrum of the float-lever or the length of the connection between the said lever and valve, as the case may be, can be variously constructed.

Figure 5:
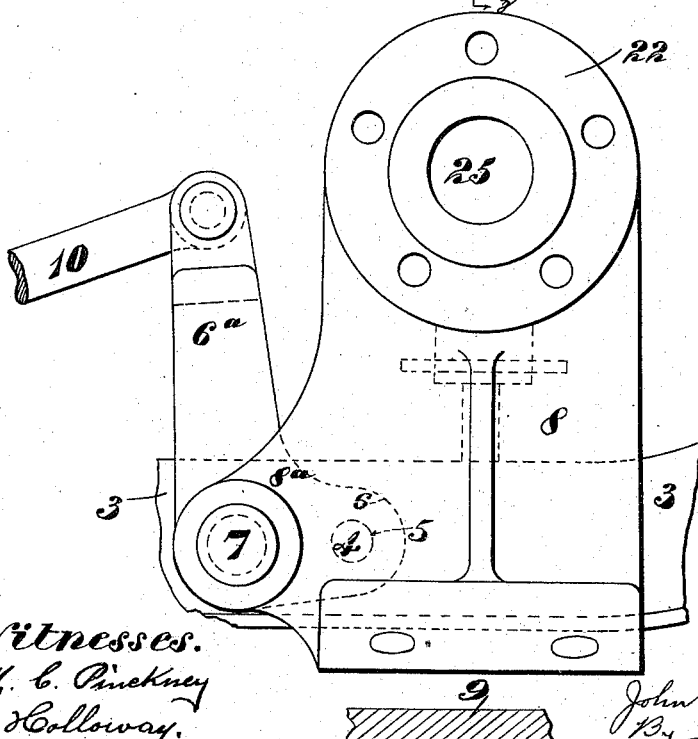

In the accompanying drawings, Figures 1 and 2 show, respectively, in side elevation and plan one arrangement of feed-water-regulating apparatus constructed according to this invention, the apparatus being represented as applied to a water-tube boiler, a portion only of which is shown. Fig. 3 is an end view of the float and the means for supporting the same. Fig. 4 is a cross-section on the line $x$ $x$ of Fig. 6; Fig. 5, a side elevation, and Fig. 6 a plan, showing the feed-valve, float-lever, and adjacent parts. Fig. 7 is a cross-section on the line $y$ $y$ of Fig. 4. Fig. 8 is a longitudinal vertical section showing a convenient arrangement of adjusting mechanism for varying the height of the fulcrum of the float-lever. Fig. 9 is a face view of an indicating device that may advantageously be used with such adjusting mechanism. Fig. 10 is a cross-section on the line $z$ $z$ of Fig. 4, but showing a different connection between the valve and float-lever. Figs. 11 and 12 are sectional elevations, and Fig. 11$^a$ a detail view, showing two arrangements for altering the length of the connection between the lever and feed-valve. Fig. 13 is a horizontal sectional view of a part of a steam cylinder or drum of a boiler, showing the automatic regulator in use. Figs. 1, 2, and 3 are drawn to a smaller scale than the remaining figures.

Referring to Figs. 1 to 10, inclusive, 1 is a float capable of withstanding considerable external pressure, for which purpose it may conveniently consist of a tightly-closed steel cylinder similar to those ordinarily used for storing gases under pressure. To it is clamped a divided ring 2, with trunnions 2$^a$, by which it is pivoted in the forked arm 3 of a balanced float-lever provided with trunnions 4, Fig. 4, by which it is fulcrumed at 5 in the forked arm 6 of a bell-crank lever that is pivoted at 7 to an extension 8$^a$ of a casting 8, fixed within the separator or upper part 9 of a water-tube boiler, the arrangement being such that by moving the said bell-crank lever 6 6$^a$ about its fulcrum 7 the fulcrum 5 of the float-lever will be raised or lowered, according to the direction in which the bell-crank lever is moved.

2$^b$ are lateral extensions of the ring 2, serving to confine the movements between the float 1 and the forked arm of the float-lever 3 within convenient limits.

A convenient arrangement of mechanism for adjusting the bell-crank lever from the exterior of the boiler comprises a link 10, that connects the upper longer arm 6$^a$ of the bell-crank lever to an adjusting-rod 11, which extends through a stuffing-box 12, fixed to the exterior of the boiler, and is capable of being moved endwise. For moving it endwise its outer end may conveniently be screw-threaded, as shown, and be provided with a correspondingly screw-threaded sleeve 13, that is mounted to rotate, but not to move endwise, in a bearing 14, carried by an extension 12* of the stuffing-box 12.
To the sleeve is secured a wheel or pulley 15, by which it can be readily rotated when it is desired to move the rod 11 endwise for the purpose of operating the bell-crank lever and adjusting the position of the fulcrum of the float-lever. In the example shown the wheel or pulley 15 is formed with a grooved rim $15^a$, so that it can be conveniently turned by an endless rope 16 (or chain) from a place at which it could not conveniently be directly actuated by hand.

To enable the stuffing-box 12 to be repacked while the boiler is under steam, the inner end of the adjusting-rod 11 may be formed with a valve-face at $11^a$, that is adapted, by moving the adjusting-rod outward, to fit closely against a correspondingly-formed seat $12^a$ on an inward extension $12^b$ of the stuffing-box 12.

To afford a ready indication of the height of the water-level for which the apparatus is for the time being set, there is or may be combined with the adjusting mechanism hereinbefore described an indicating device comprising a fixed scale 17 (or scales) and an index or finger $17^a$, Figs. 8 and 9, which is operated in any suitable way from the adjusting mechanism, as, for example, by fixing it to a spirally-twisted rod 18, mounted in suitable bearings 19 and operated by an arm 20, which fits the said spirally-twisted rod after the manner of a nut and is fixed to the longitudinally-adjustable rod 11. The rod 18 and arm 20 also serve to prevent rotation of the adjusting-rod.

21, Figs. 4 and 10, is the feed-water valve, arranged in the valve-case 22, which, in the example shown, is cast in one with the support 8. The feed-valve may advantageously be constructed as a double-cone valve that is nearly balanced, as shown, and is arranged to control two delivery-ports 23 between the supply and delivery passages 24 and 25, the valve being arranged to open downward, so that in the event of an accident, such as the falling out of either of the pivot or fulcrum pins at 5 or 7, it will automatically fall by gravity and leave the ports 23 full open. The feed-water may be led to and from the passages 24 and 25, respectively, by pipes arranged in any desired manner within the boiler.

In using the regulator in my type of boiler it is preferably located near the bottom 9 of the steam-drum. From the valve-casing 22 an inlet-pipe $24^a$, wholly within the steam-drum, leads to the end of said drum. From the outlet-port 25 of the valve-casing leads a distributing-pipe $25^a$, having holes $25^b$ in its lower side. The regulator being wholly within the drum, the float is as near as possible to the center of motion due to rolling of the vessel on which it is being used, (when used in marine work,) and pipe $24^a$ being located as described, water passing through it to the valve is considerably heated before entering the drum. Moreover, the pipe connections are simpler than with regulators located in chambers exterior to the boiler but connected therewith. In Fig. 13 a hand-wheel or fingernut $15^b$ is shown for adjusting the float and valve from the outside of the boiler.

To reduce friction between the float-lever 3 and feed-valve 21 to a minimum, the two are connected by means of a pin or link freely jointed to each. In the arrangement shown in Figs. 4 and 5 a link 26 is articulated to the lever and valve by ball-and-socket joints at 27 and 28, respectively, the lower ball-bearing at 27 having a detachable part $27^a$, and the upper bearing having a detachable screw-threaded bush $28^a$, divided longitudinally into two parts, one of which is provided with a flange $28^b$, by which it is connected by a pin $28^c$ to a similar flange $21^a$ of an extension $21^b$ of the feed-valve. In the modified arrangement shown in Fig. 10 the float-lever 3 has articulated thereto by a ball-and-socket joint at 27 a pin 26, the upper end of which is coned and loosely fitted into a conical recess $21^c$ in the extension $21^b$ of the valve, accidental disconnection of the two being prevented by a pin 29, carried by the valve extension and extending freely through a hole or slot 30 in the said pin.

Figs. 11 and 12 are diagrammatic views illustrating partly in elevation and partly in vertical section a modified arrangement in which instead of moving the fulcrum 5 of the float-lever 3, as in the arrangement shown in Figs. 1 to 7, inclusive, an equivalent result is obtained by varying the length of the connection between the said float-lever and the feed-valve. In the example shown for this purpose in Fig. 11, and in detail in Fig. $11^a$, the connecting-pin 26 is connected to the lever by a pair of links $26^a$ and is formed with a screw-thread, and the feed-valve 21 is screwed upon the said pin after the manner of a nut and is formed with an externally-toothed flange $21^d$, with which gears a long pinion 31, fixed upon a spindle $10^*$, that is guided in a bearing $8^*$ on the valve-case and is led through a stuffing-box on the boiler-shell to the exterior of the boiler, where it is provided with a hand-wheel or equivalent adjusting device. As will be seen, the arrangement is such that by rotating the pinion the feed-valve 21 can be screwed up and down on the pin 26 and the length of connection between the feed-valve and float-lever thus varied, from the exterior of the boiler, to suit requirement.

In the modified arrangement shown in Fig. 12 the connection between feed-valve and float-lever is made in the form of a pair of toggle-arms 26 26ª, the former, 26, being jointed to the float-lever 3 at 27 and the latter, 26ª, being connected to feed-valve at 28 by a ball-and-socket joint, as in Fig. 4. The positions of the said two toggle-arms relatively to each other, and consequently the length of the connection between the lever and feed-valve, can be adjusted when desired from the exterior of the boiler by connecting their jointed ends by a link 10 to adjusting mechanism such as that shown in Figs. 1, 2, and 8.

Feed-water-regulating apparatus such as described is very desirable in water-tube boilers, as above referred to, because the volume of water contained in such boilers is very limited, and it is specially suitable for boilers such as those described in the specification of my Patents Nos. 387,547 and 452,401, and others of a similar type, as the feed-regulating devices can be conveniently placed in the steam-separator or upper vessel of such boilers.

By the construction of apparatus described it will be seen that the friction resulting from the use of stuffing-boxes and plug cocks or valves, as in boiler-feed-regulating apparatus as heretofore constructed, is entirely avoided, so that the apparatus is rendered very sensitive and therefore effective in maintaining a practically constant water-level in the boiler in which it is fitted.

What I claim is—

1. The combination with a steam-boiler, of feed-water-regulating apparatus comprising a feed-water valve having its casing fixed within said boiler and its inlet and outlet pipes or passages located within said boiler, a balanced float-lever carried by and external to said valve-case and connected with said valve, regulating mechanism also located within the boiler, and capable of varying the distance between said float-lever and the seat of said valve, and means for adjusting said regulating mechanism from the exterior of said boiler substantially as herein described for the purpose specified.

2. The combination with a steam-boiler, of feed-water-regulating apparatus located within said boiler and comprising a feed-water valve, arranged to discharge direct into said boiler, a float subject to the action of the varying water-level in the boiler, a balanced lever of the first order connected with said valve and float, a second lever upon one arm of which said float-lever is fulcrumed, and means capable of being operated from the exterior of the boiler so as to operate said second lever and vary the position of the fulcrum of said float-lever, substantially as described.

3. Feed-water-regulating apparatus comprising a feed-water valve adapted to discharge direct into a boiler, a float, a balanced lever of the first order connecting said valve and float, a second lever upon one arm of which the float-lever is directly fulcrumed, and adjusting mechanism connected with said second lever and capable of being operated from the exterior of the boiler so as to vary the position of the fulcrum of said float-lever, substantially as herein described.

4. The combination with a steam-boiler, of feed-water-regulating apparatus located within said boiler and comprising a feed-water valve arranged to discharge direct into said boiler, float-operated mechanism arranged externally to the valve-case and adapted to control said valve, a lever upon which said float-operated mechanism is pivoted, an adjusting device external to said boiler and connected with said lever, and an indicating device also external to said boiler and operated by said adjusting device, substantially as herein described for the purpose specified.

5. The combination with a steam-boiler, of feed-water-regulating apparatus located within said boiler and comprising a standard or support fixed within said boiler and carrying the casing of a feed-water valve, a feed-water valve located within said casing, float-operated mechanism carried by said standard or support and connected with said feed-valve, and means for adjusting said float-operated mechanism from the exterior of the boiler, substantially as herein described for the purpose specified.

6. The combination with a steam-boiler, of feed-water-regulating apparatus located within said boiler and comprising a feed-water valve having its casing fixed within said boiler, a lever pivoted to said valve-casing or an extension thereof, float-operated mechanism fulcrumed upon said lever and connected with said feed-valve, and means for adjusting said lever from the exterior of said boiler, substantially as described for the purpose specified.

7. The combination with a steam-boiler, of feed-water-regulating apparatus located within said boiler and comprising a valve-case fixed within said boiler and having inlet and outlet passages and a nearly-balanced feed-valve arranged to open downward by gravity, float-operated valve-controlling mechanism connected to said valve, and an adjusting device connected with said valve-controlling mechanism and adapted to be operated from the exterior of the boiler, substantially as described.

8. The combination with a steam-boiler, of feed-water-regulating apparatus located within said boiler and comprising a valve-case fixed within said boiler and having inlet and outlet passages and a nearly-balanced feed-valve arranged to open downward by gravity, float-operated valve-controlling mechanism comprising a lever carried by an extension of said valve-case, a connecting pin or link freely jointed to said valve and controlling-lever but so as to have no endwise motion relatively to either, and means for adjusting the action of said mechanism, substantially as described for the purpose specified.

9. The combination with a steam-boiler, of feed-water-regulating apparatus comprising a valve-case fixed within said boiler and having inlet and outlet passages and a nearly-balanced valve arranged to open downward by gravity, a float-lever connected to said valve by a link articulated to both, a bell-crank lever in one arm of which said float-lever is pivoted, a longitudinally-movable adjusting-rod arranged to work through a stuffing-box on the boiler-shell and connected with the other arm of said bell-crank lever, and means for moving said rod in an endwise direction, substantially as described.

10. The combination with a steam-boiler, of feed-water-regulating apparatus comprising a valve-case fixed within said boiler and having inlet and outlet passages and a nearly-balanced valve arranged to open downward by gravity, a float-lever connected to said valve by a link articulated to both, a bell-crank lever in one arm of which said float-lever is pivoted, a longitudinally-movable adjusting-rod arranged to work through a stuffing-box on the boiler-shell and connected with the other arm of said bell-crank lever, means for moving said rod in an endwise direction, and means for indicating the extent of endwise movement of said rod substantially as herein described.

In testimony whereof I have signed my name to this specification in the presence of two subscribing witnesses.

JOHN ISAAC THORNYCROFT.

Witnesses:
EDMUND S. SNEWIN,
WM. O. BROWN.